(12) United States Patent
Tanaka et al.

(10) Patent No.: US 12,012,001 B2
(45) Date of Patent: Jun. 18, 2024

(54) HYBRID VEHICLE INVERTER WIRE

(71) Applicant: Mazda Motor Corporation, Hiroshima (JP)

(72) Inventors: Hiroshi Tanaka, Aki-gun (JP); Satoshi Ueno, Aki-gun (JP); Akihiro Furukawa, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 525 days.

(21) Appl. No.: 17/342,165

(22) Filed: Jun. 8, 2021

(65) Prior Publication Data

US 2022/0001734 A1 Jan. 6, 2022

(30) Foreign Application Priority Data

Jul. 1, 2020 (JP) ................................. 2020-113719

(51) Int. Cl.
*B60K 6/26* (2007.10)
*B60K 6/24* (2007.10)
*B60L 53/20* (2019.01)
*B60R 16/02* (2006.01)
*B62D 25/20* (2006.01)
*H02K 9/19* (2006.01)

(52) U.S. Cl.
CPC ................. *B60K 6/26* (2013.01); *B60K 6/24* (2013.01); *B60L 53/20* (2019.02);
(Continued)

(58) Field of Classification Search
CPC ... B60K 6/26; B60K 6/24; B60K 6/40; B60K 6/00; B60K 6/22; B60K 6/20;
(Continued)

(56) References Cited

U.S. PATENT DOCUMENTS 8,444,216 B2 * 5/2013 Yamaguchi ......... B60R 16/0207
296/208
8,474,555 B2 * 7/2013 Kanno ................. B60H 1/3222
180/65.1

(Continued)

FOREIGN PATENT DOCUMENTS

JP 2006168600 A 6/2006
JP 2019162964 A 9/2019

OTHER PUBLICATIONS

European Patent Office, Extended European Search Report Issued in Application No. 21179673.5, Nov. 17, 2021, Germany, 7 pages.

*Primary Examiner* — James M Dolak
(74) *Attorney, Agent, or Firm* — Alleman Hall & Tuttle LLP

(57) ABSTRACT

Provided is a vehicle capable of suppressing failure of an inverter while suppressing an increase in manufacturing cost by unitizing an engine and a motor. A drive unit as a drive source for travel of the vehicle has the engine and the motor. A torque tube is connected to a rear portion of the motor. The torque tube covers a propeller shaft that is coupled to an output shaft of the drive unit. An inverter is arranged above the torque tube. The inverter is separated from the drive unit and is separated from the torque tube. A terminal of the inverter and a terminal of the motor are connected by three wire harnesses. Each of the wire harnesses has a wire length that is longer than a linear distance connecting the terminal and the terminal by the shortest distance.

12 Claims, 11 Drawing Sheets

(52) U.S. Cl.
CPC .......... *B60R 16/0207* (2013.01); *B62D 25/20* (2013.01); *H02K 9/19* (2013.01); *B60Y 2400/20* (2013.01); *B60Y 2400/43* (2013.01)

(58) Field of Classification Search
CPC .............. B60K 6/405; B60K 2001/006; B60K 2001/003; B60K 1/00; B60K 1/02; B60K 11/02; B60K 11/04; B60K 11/00; B60R 16/0207; B60R 16/00; B60R 16/02; B60R 16/0215; B62D 25/20; B60Y 2400/20; B60Y 2400/43; B60Y 2400/61; B60Y 2200/92; B60Y 2200/90; B60Y 2410/115; B60L 53/20; B60L 3/003; B60L 3/0061; B60L 50/13; B60L 15/007
See application file for complete search history.

(56) References Cited

U.S. PATENT DOCUMENTS

| | | | | |
|---|---|---|---|---|
| 8,517,127 B2* | 8/2013 | Kanno | ............... | B60L 58/26 |
| | | | | 180/65.8 |
| 8,545,367 B2* | 10/2013 | Hartz | ............... | B60W 10/30 |
| | | | | 475/5 |
| 8,631,886 B2* | 1/2014 | Kawamura | ............. | B60L 58/12 |
| | | | | 903/905 |
| 8,770,326 B2* | 7/2014 | Matano | ............... | B60K 1/00 |
| | | | | 180/65.1 |
| 8,892,287 B2* | 11/2014 | Takeuchi | ............. | B60W 10/06 |
| | | | | 180/65.265 |
| 9,006,939 B2* | 4/2015 | Toyama | ............... | B60L 50/40 |
| | | | | 307/147 |
| 9,187,050 B2* | 11/2015 | Tanigaki | ............... | B60L 1/02 |
| 9,586,543 B2* | 3/2017 | Ukai | ............... | B60K 1/00 |
| 9,744,924 B2* | 8/2017 | Inao | ............... | H02G 3/04 |
| 10,434,861 B2* | 10/2019 | Narisawa | ............... | B60K 1/04 |
| 10,632,830 B2* | 4/2020 | Sugizaki | ............... | B60K 6/26 |
| 11,760,184 B2* | 9/2023 | Oshida | ............... | B60K 13/04 |
| | | | | 180/65.21 |
| 11,912,133 B2* | 2/2024 | Tanizawa | ............... | B60L 1/003 |
| 11,919,386 B2* | 3/2024 | Chen | ............... | H02K 7/116 |
| 11,919,570 B2* | 3/2024 | Sato | ............... | B62D 21/11 |
| 2011/0133548 A1 | 6/2011 | Toyama et al. | | |
| 2016/0152196 A1 | 6/2016 | Inao et al. | | |
| 2017/0232866 A1 | 8/2017 | Sugizaki et al. | | |
| 2021/0016765 A1* | 1/2021 | Toda | ............... | B60K 6/547 |

* cited by examiner

HYBRID VEHICLE INVERTER WIRE

TECHNICAL FIELD

The present invention relates to a vehicle and, in particular, to an arrangement structure of a wire harness that connects a motor as a drive source for travel of the vehicle and an inverter.

BACKGROUND ART

In recent years, for purposes of reducing an environmental load and the like, hybrid vehicles including a motor in addition to an engine as drive sources of vehicle travel have been widespread.

In Patent Document 1, an automobile that includes an engine and a motor as drive sources for travel is disclosed. In the automobile disclosed in Patent Document 1, both of the engine and the motor, which are provided as the drive sources for the travel, are mounted in a front area.

The automobile disclosed in Patent Document 1 can be switched between an engine-drive mode in which the automobile travels by using the engine and a motor-drive mode in which the automobile travels by using the motor. When a driver selects the motor-drive mode, the automobile travels by driving the motor.

Meanwhile, when the driver selects the engine-drive mode, the motor exerts a torque assist function at a start of the automobile, and the automobile travels at a specified vehicle speed or higher by driving the engine.

PRIOR ART DOCUMENTS

Patent Documents

Patent Document 1: JP2019-162964A

SUMMARY OF THE INVENTION

Problem to be Solved by the Invention

Further improvement in vehicle motion performance has been requested for the hybrid vehicle as described above. When attempting to improve the vehicle motion performance, it is beneficial to unitize and arrange the engine and the motor in an area near a center of the vehicle. When the engine and the motor are unitized and arranged in the area as described above, the vehicle can easily turn, and the vehicle motion performance can be improved.

Here, in the hybrid vehicle, a battery is a source of electricity for the motor. While the battery outputs a DC current, a majority of the motors, each of which is used as a drive source for the travel of the vehicle, is driven by an AC current. For this reason, an inverter is interposed between the battery and the motor, and the inverter converts the DC current into the AC current.

For the conventional hybrid vehicles, a structure of fixing the inverter onto the motor is frequently adopted. This structure is adopted to reduce a distance between the motor and the inverter and to reduce a length of a bus bar as a connection wire between the motor and the inverter as much as possible.

However, in the vehicle, for which a drive unit unitizing the engine and the motor is adopted, direct fixation of the inverter onto the drive unit such as the motor is desirably avoided as much as possible. This is because if the inverter is fixed onto the motor in the vehicle for which the drive unit having the engine and the motor is adopted, the vibration generated during driving of the engine is directly transmitted to the inverter. It is considered that electrical components of the inverter are damaged by this vibration and, depending on the case, the vibration becomes a cause of failure.

It is considered that the failure of the inverter can be avoided by constructing the inverter of vibration-resistant parts even when a structure of fixing the inverter onto the motor is adopted. However, the adoption of such a structure causes an increase in manufacturing cost of the inverter, and thus is difficult.

The present invention has been made to solve the problem as described above and therefore has a purpose of providing a vehicle capable of suppressing failure of an inverter while suppressing an increase in manufacturing cost by unitizing an engine and a motor.

Means for Solving the Problem

The present inventors considered a structure of separately arranging the inverter from the drive unit. When the inverter is separately arranged from the drive unit, just as described, the vibration generated during driving of the engine is not directly transmitted to the inverter. Thus, failure of the inverter can be suppressed without adopting the inverter using expensive electrical components. Therefore, it is considered that the failure of the inverter can be suppressed while suppressing the increase in the manufacturing cost.

However, in the case where the inverter is separated from the drive unit, a distance between the inverter and the motor is increased, and thus a wire length of the connection wire that connects the inverter and the motor has to be increased by such an increase. As described above, in the related art for which a structure of connecting the inverter and the motor by a bus bar is adopted, in the case where the wire length is increased as described above, stress that acts on the bus bar during the vibration of the engine is increased. In the case where it is attempted to prevent the damage to the connection wire at the time when such an inverter is separately arranged from the drive unit, it is considered to make the bus bar strong by increasing a cross-sectional area, using a high-strength material, or the like. However, such a case causes the increase in the manufacturing cost and weight increase.

In view of the above, a vehicle according to an aspect of the present invention includes: a drive unit that is a drive source for travel of the vehicle and has an engine and a motor arranged adjacent to each other; an inverter that converts a DC current into an AC current and outputs the AC current; and a connection wire that electrically connects an output terminal of the inverter and an input terminal of the motor. The inverter is arranged separately from the drive unit. The connection wire is flexible and is formed of a wire harness, a wire length of which is longer than a linear distance between the output terminal of the inverter and the input terminal of the motor.

In the vehicle according to the above aspect, the drive unit, in which the engine and the motor are unitized, is provided. Thus, compared to a case where the engine and the motor are not unitized, it is possible to downsize the drive source and to arrange the drive unit at or near a center of the vehicle. Therefore, it is possible to improve vehicle motion performance of the vehicle according to the above aspect.

In the vehicle according to the above aspect, the inverter is arranged separately from the drive unit. Thus, it is possible to suppress vibration generated during driving of the engine from having an impact on the inverter. Thus, in the vehicle according to the above aspect, it is possible to suppress failure of the inverter caused by the vibration during driving of the engine.

Furthermore, in the vehicle according to the above aspect, the flexible wire harness is used instead of a bus bar to connect the inverter and the motor, and the wire length of the wire harness is set to be longer than the linear distance between the output terminal of the inverter and the input terminal of the motor. Thus, it is possible to suppress a large stress from acting on the wire harness even when the vibration is generated during driving of the engine. That is, the flexible wire harness is used, and the wire harness having the longer wire length than the linear distance is flexed and arranged between the inverter and the motor. In this way, even when the vibration is applied to the wire harness, buffering can be achieved. Therefore, it is possible to suppress the damage to the wire harness caused by the vibration while suppressing the increase in the cost.

In the vehicle according to the above aspect, the drive unit may be attached to a first position of a vehicle body, and the inverter may be attached to a second position that is separated from the first position in the vehicle body.

As described above, it is possible to suppress transmission of the vibration from the engine to the inverter via an attachment position of the vehicle body by separating the attachment position (the second position) of the inverter to the vehicle body from the attachment position (the first position) of the drive unit to the vehicle body. Thus, the adoption of the above configuration is further beneficial to suppression of the damage to the inverter caused by the vibration during driving of the engine.

In the vehicle according to the above aspect, the second position may be located at a portion formed with a floor tunnel in a floor panel, and the connection wire may be arranged in the floor tunnel.

As described above, when the inverter is attached to the portion formed with the floor tunnel in the floor panel, it is possible to effectively suppress the transmission of the vibration during driving of the engine to the inverter via the vehicle body. That is, the floor tunnel is a high-rigid portion that is provided to reinforce rigidity of the vehicle body. Thus, the attachment of the inverter to such a portion is beneficial to suppression of the transmission of the vibration caused by driving of the engine to the inverter.

As described above, when the connection wire is arranged in the floor tunnel, it is possible to suppress exposure of the connection wire to a cabin and narrowing of the cabin.

In the vehicle according to the above aspect, when the engine and the connection wire are seen from one side in a direction in which the engine and the motor are adjacent to each other, the connection wire may be arranged to be located on an inner side of an outer circumference of the engine.

As described above, since the connection wire is arranged to be located on the inner side of the outer circumference of the engine, it is possible to fit the connection wire within the floor tunnel while suppressing an increase in cross-sectional size of the floor tunnel.

The vehicle according to the above aspect may further include: a shaft that is coupled to an output shaft of the drive unit and transmits drive power to a drive wheel; and a cover member that covers the periphery of the shaft. The inverter may be arranged separately from the cover member.

As described above, the inverter is arranged separately from the cover member. In this way, it is possible to further suppress the vibration generated during driving of the engine from being transmitted to the inverter via the cover member.

That is, the vibration of the engine is transmitted to the cover member that is provided to cover the periphery of the shaft. However, when the inverter is arranged separately from the cover member, it is possible to suppress the vibration generated during driving of the engine from being transmitted to the inverter via the cover member.

In the vehicle according to the above aspect, when the cover member and the connection wire are seen from an outer side in a direction that crosses an extending direction of the shaft, the connection wire may be arranged to be curved in a manner to route around a specified area above the cover member.

As described above, in the case where a configuration that the connection wire is arranged to be curved in the manner to route around the specified area above the cover member is adopted, it is possible to attach another member to the specified area and to efficiently use the space. Thus, it is beneficial to downsizing of the set configuration including the drive unit and auxiliary parts.

In the vehicle according to the above aspect, a motor cooling member may be attached to the specified area.

When the motor cooling member is attached to the specified area as described above, it is possible to efficiently use the space.

The vehicle according to the above aspect may further include: a motor cooling oil path as a path of oil for cooling the motor; and an ebullient cooler having: a circulation path for circulating an ebullient cooling refrigerant, a boiling point of which is lower than that of the oil flowing through the motor cooling oil path; an ebullient section that is disposed in the middle of the circulation path and in which the oil and the ebullient cooling refrigerant exchange heat; and a condensation section that condenses the ebullient cooling refrigerant. The motor cooling member may be the condensation section of the ebullient cooler.

As described above, when the ebullient cooler is attached to the motor, it is possible to effectively cool the heat generated during driving of the motor. Thus, in the case where the above configuration is adopted, the motor can be maintained at the appropriate temperature even when the motor is driven to generate high output or is continuously driven for a long time.

In the vehicle according to the above aspect, the condensation section may be attached to an upper side of the cover member in a vertical direction of the vehicle.

As described above, when such a configuration that the condensation section of the ebullient cooler is attached to the upper side of the cover member is adopted, it is possible to suppress the heat released from the condensation section from being transferred to the motor and the like via the cover member. That is, it is considered that the heat released from the condensation section is transferred to the cover member in the case where the condensation section is attached to a lower side of the cover member. In such a case, the heat released from the condensation section is transferred to the motor via the cover member.

Meanwhile, when the condensation section is attached to the upper side of the cover member as described above, it is possible to suppress the heat released from the condensation section from being transferred to the motor via the cover member.

In the vehicle according to the above aspect, the connection wire may be one of a plurality of connection wires, one end of each of the connection wires may be connected to respective one of a plurality of first connection portions in the output terminal, and the other end of each of the connection wires may be connected to respective one of a plurality of second connection portions in the input terminal. In the case where a first imaginary straight line running through the plurality of the first connection portions and a second imaginary straight line running through the plurality of the second connection portions are assumed, and the output terminal and the input terminal are seen from the outer side in the direction that crosses the extending direction of the shaft, at least one of the first imaginary straight line and the second imaginary straight line may extend in an oblique direction with respect to the extending direction of the shaft.

As described above, when the plurality of the first connection portions and/or the plurality of the second connection portions is arranged such that at least one of the first imaginary straight line and the second imaginary straight line extends in the oblique direction with respect to the extending direction of the shaft, it is possible to suppress the connection wires from overlapping each other in a cross-sectional direction of the cover member. Thus, it is possible to arrange the connection wires along a surface of the cover member and thus to suppress projection of the cover member in the cross-sectional direction.

In the vehicle according to the above aspect, the engine may be a rotary engine.

As described above, in the case where the rotary engine is adopted, the vibration is generated at a high speed. However, when the connection wires as described above are adopted, it is possible to suppress the damage to the inverter and the connection wires caused by the vibration during driving of the engine.

Advantage of the Invention

In the vehicle according to each of the above aspects, it is possible to suppress the failure of the inverter while suppressing the increase in the manufacturing cost by unitizing the engine and the motor.

MODES FOR CARRYING OUT THE INVENTION

Figure 1:
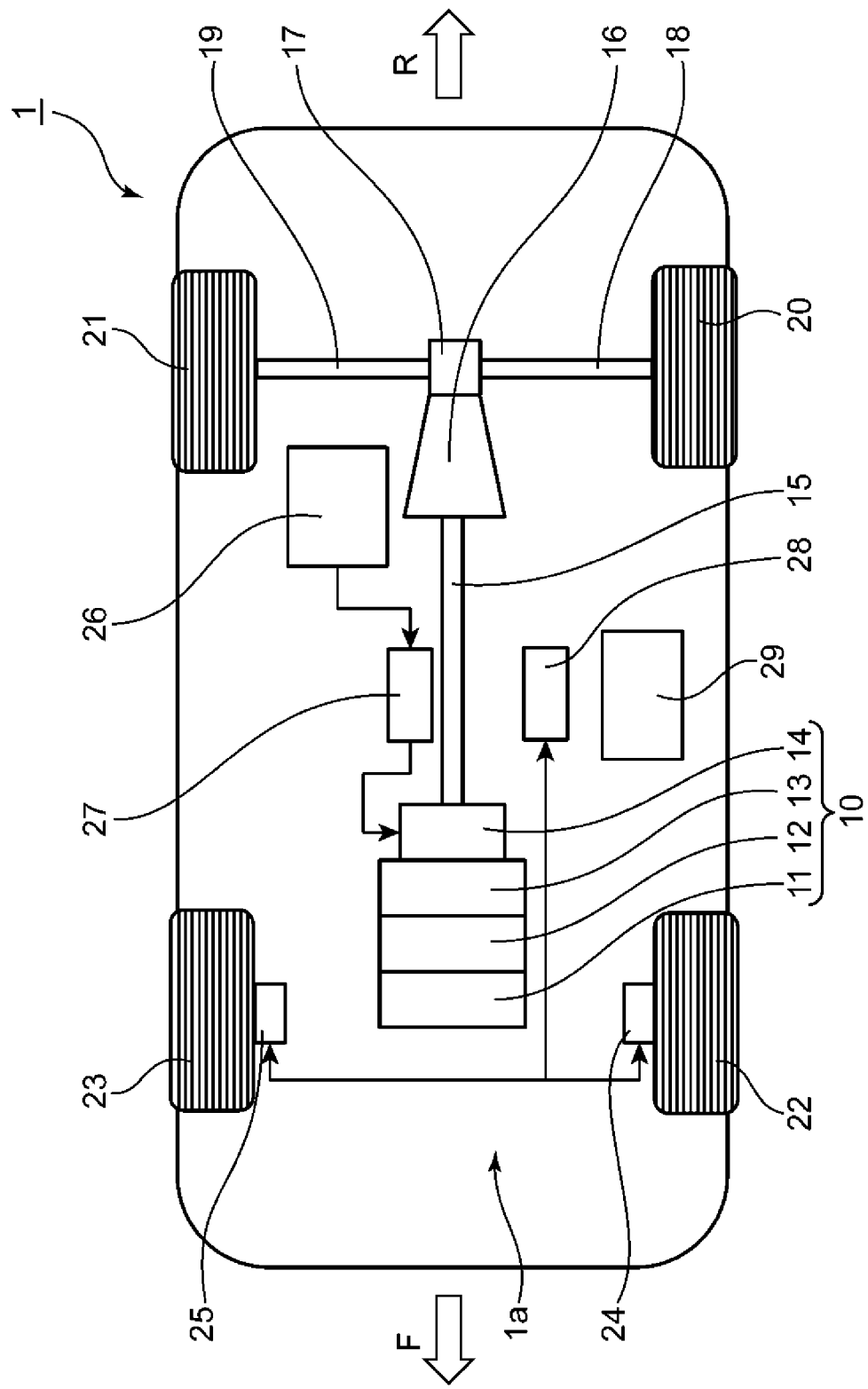
FIG. 1 is a schematic view illustrating an outline configuration of a vehicle according to an embodiment.

A description will hereinafter be made on an embodiment of the present invention with reference to the drawings. The embodiment, which will be described below, merely constitutes an example of the present invention, and the present invention is not limited to the following embodiment in any respect except for an essential configuration thereof.

In the drawings used in the following description, "F," "R," "U,", "L," "Le," and "Ri" respectively indicate a front side of a vehicle, a rear side of the vehicle, an upper side of the vehicle, a lower side of the vehicle, a left side of the vehicle, and a right side of the vehicle.

Embodiment

1. Schematic Configuration of Vehicle 1

A description will be made on a schematic configuration of a vehicle 1 according to this embodiment with reference to FIG. 1.

As illustrated in FIG. 1, in the vehicle 1, a drive unit 10 for driving the vehicle 1 is mounted in a rear portion of a front area 1a. The drive unit 10 includes engines 11 to 13 and a motor 14. A detailed structure of the drive unit 10 will be described below.

A propeller shaft 15 is connected to an output shaft of the drive unit 10. The propeller shaft 15 is a "shaft" that transmits drive power from the drive unit 10 to rear wheels 20, 21 as drive wheels. The propeller shaft 15 extends rearward at a center in a vehicle width direction of the vehicle 1. A rear end of the propeller shaft 15 is connected to a transmission 16.

A differential gear 17 is connected to the transmission 16. Driveshafts 18, 19 are respectively coupled to left and right portions of the differential gear 17 in the vehicle width direction. The driveshafts 18, 19 are connected to the rear wheels 20, 21, respectively. That is, in the vehicle 1 according to this embodiment, the rear wheels 20, 21 are driven for travel by the drive power that is generated by the drive unit 10 mounted in the front area 1a.

In the vehicle 1, motors 24, 25 are respectively connected to front wheels 22, 23. Although not illustrated in detail, each of the motors 24, 25 is a so-called in-wheel motor. Each of the motors 24, 25 functions as an assist motor that generates power at a start of the vehicle 1 and transmits the power to respective one of the front wheels 22, 23. Each of the motors 24, 25 also functions as a regenerative brake that generates electricity during deceleration of the vehicle 1. The electricity, which is generated by the motors 24, 25 during the deceleration of the vehicle 1, is stored in a capacitor 28 and the like.

A battery 26 and an inverter 27 are also mounted on the vehicle 1. The battery 26 is an electricity storage module for supplying the electricity to the motor 14 in the drive unit 10. The inverter 27 is an electricity conversion module that converts a DC current supplied from the battery 26 to an AC current.

Here, the vehicle 1 according to this embodiment has, as drive modes of the drive unit 10, an engine-drive mode and a motor-drive mode. The engine-drive mode is a mode in which the rear wheels 20, 21 are driven by the drive power output from the engines 11 to 13 and the vehicle 1 thereby travels. The motor-drive mode is a mode in which the rear wheels 20, 21 are driven by the drive power output from the motor 14 and the vehicle 1 thereby travels.

The vehicle 1 is configured that the motor 14 does not generate the drive power at the time of driving in the engine-drive mode and that the engines 11 to 13 do not generate the drive power at the time of driving in the motor-drive mode.

In the vehicle 1, a drive mode control section 29 executes switching control between the engine-drive mode and the motor-drive mode. The drive mode control unit 29 is configured to include a microcomputer that has a processor (i.e., a central processing unit (CPU)), memory (i.e., ROM and/or RAM), and the like. The drive mode control unit 29 executes drive mode control on the basis of an instruction from a driver, a situation of the vehicle 1 (a vehicle speed, acceleration/deceleration, a battery remaining amount), or the like.

2. Mounting Position of Drive Unit 10

Figure 2:
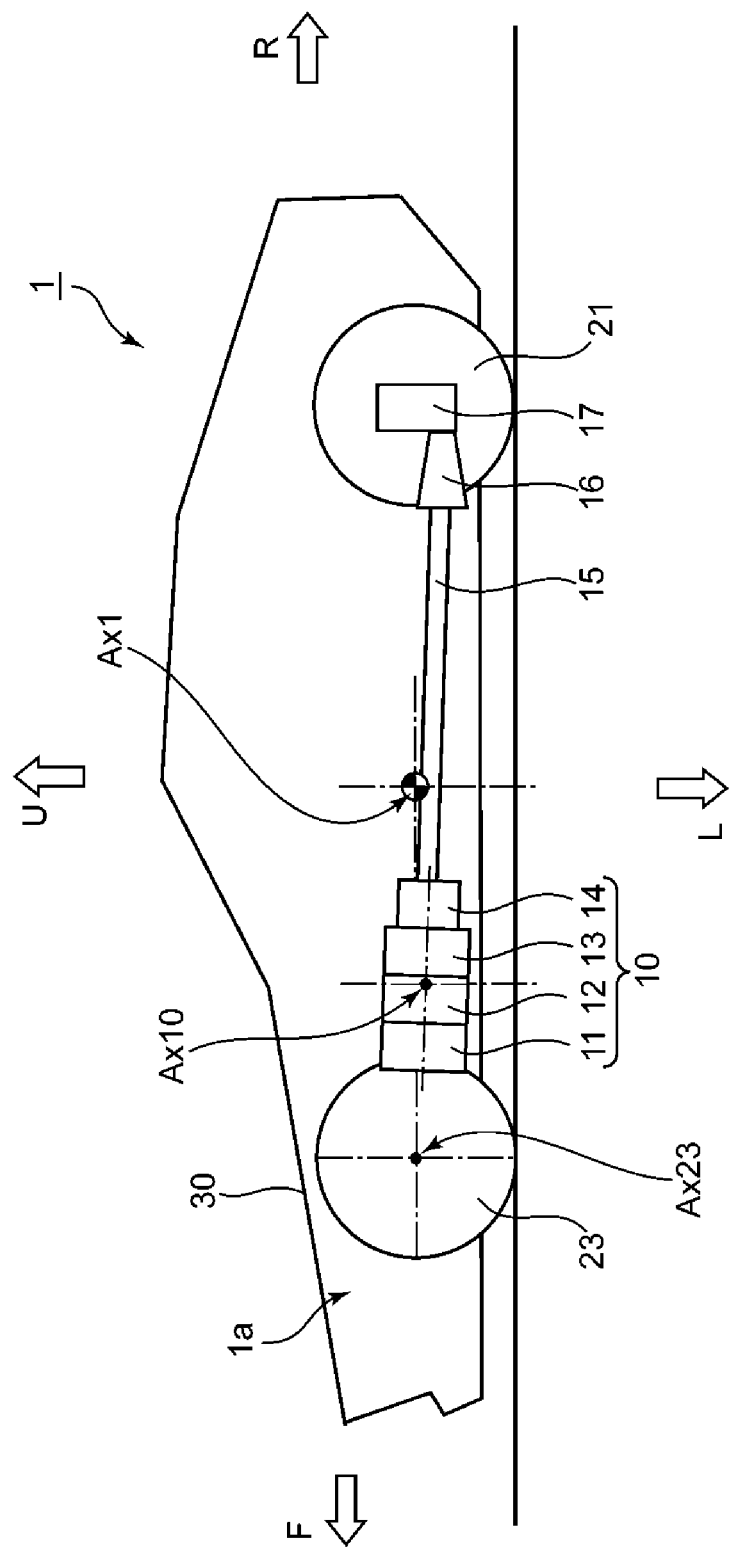
FIG. 2 is a schematic view illustrating a mounting position of a drive unit in the vehicle.

A description will be made on a mounting position of the drive unit 10 in the vehicle 1 with reference to FIG. 2.

As described above, in the vehicle 1, the drive unit 10 is mounted in the rear portion of the front area 1a. More specifically, the drive unit 10 is mounted such that center of gravity Ax10 of the drive unit 10 is located behind rotation center Ax23 of the front wheels 22, 23 (only the front wheel 23 is illustrated in FIG. 2). In addition, the drive unit 10 is mounted such that the center of gravity Ax10 thereof is located below the rotation center Ax23 of the front wheels 22, 23.

That is, in the vehicle 1, the drive unit 10 as a heavy object is made to be compact, and the drive unit 10 is thereby mounted in the rear portion of the front area 1a and below a hood 30 with a clearance being interposed therebetween. In this way, a position Axl of center of gravity of the vehicle 1 can be set to a low position substantially at the center in a longitudinal direction of the vehicle 1.

3. Configurations of Drive Unit 10 and Peripheries

A description will be made on a detailed configuration of the drive unit 10 and configurations of peripheries thereof with reference to FIG. 3 to FIG. 5.

Figure 3:
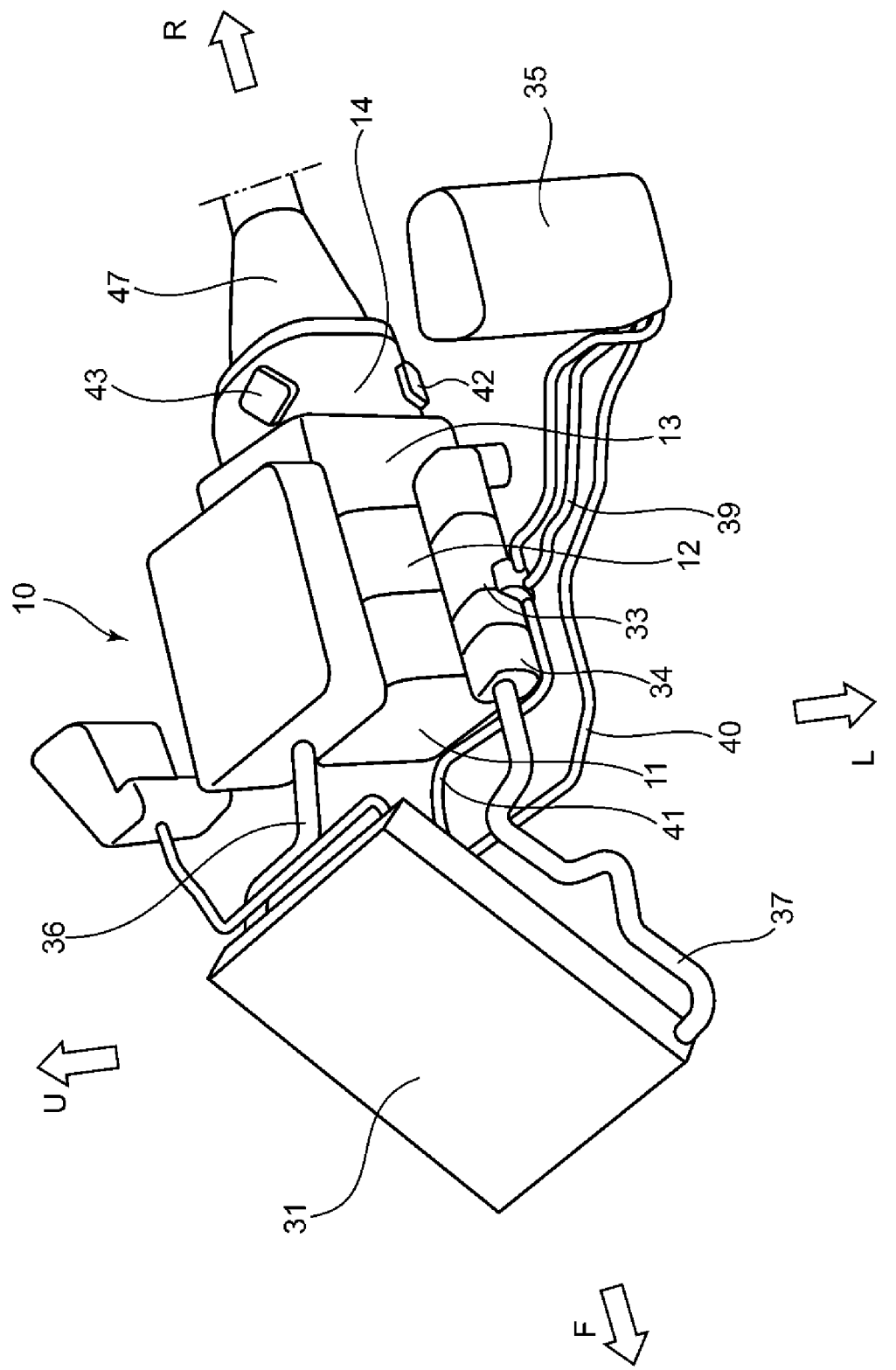
FIG. 3 is a perspective view illustrating a configuration of the drive unit.
Figure 4:
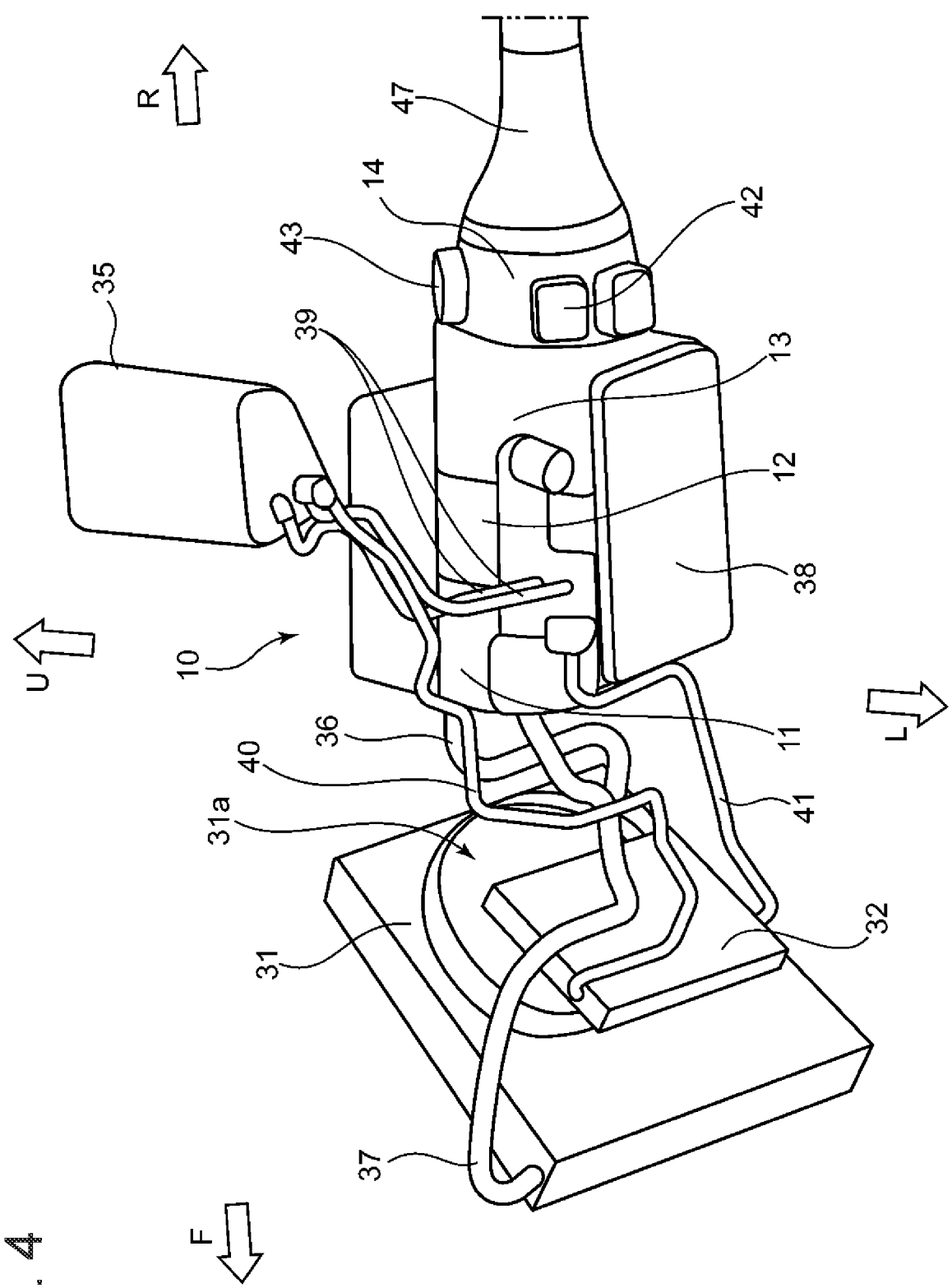
FIG. 4 is a perspective view illustrating the configuration of the drive unit.

As illustrated in FIG. 3 and FIG. 4, each of the engines 11 to 13 provided in the drive unit 10 is a rotary engine having a rotary piston as an example. The adoption of the rotary engines as the engines 11 to 13 in the vehicle 1 is beneficial for downsizing of the drive unit 10. Although not illustrated in detail, the drive unit 10 is fixed to a front subframe via a mount. The front subframe is an example of a "first position of a vehicle body" in the present disclosure and is a part of the vehicle body that is provided, in a lower portion of the front area 1a, across front side frames disposed on the right and left sides.

As illustrated in FIG. 4, an oil pan 38 is disposed below the engines 11 to 13. The oil pan 38 has a flat shape in which a dimension in a height direction is smaller than dimensions in the vehicle longitudinal direction and the vehicle width direction. This is beneficial to suppress a height of the drive unit 10 to be low.

As described above, in the vehicle 1 according to this embodiment, the oil pan 38 has the flat shape, and thus an accommodation volume of engine oil therein is low. For this reason, the oil pan 38 has a primary purpose of collecting the engine oil that has flowed through the engines 11 to 13. Thus, an oil tank 35 is provided on a side of the drive unit 10 to store the engine oil collected in the oil pan 38.

As illustrated in FIG. 3 and FIG. 4, a radiator 31 and an oil cooler 32 are disposed in front of the drive unit 10. The radiator 31 is a device for cooling a coolant, a temperature of which has become high by heat from the engines 11 to 13, and has a radiator fan 31a on a rear side thereof.

The oil cooler 32 is arranged behind the radiator 31 and is disposed along the radiator 31. The oil cooler 32 has a smaller plane size than the radiator 31.

Pipes 36, 37 connect the engines 11 to 13 and the radiator 31. A water pump 34 is provided to a connection portion between the pipe 37 and each of the engines 11 to 13.

Two each of the oil cooler 32, the engines 11 to 13, the oil tank 35, and the oil pan 38 are connected by respective one of pipes 39 to 41 and the like. An oil pump 33 is provided to a connection portion between the pipe 41 and each of the engines 11 to 13.

The motor 14 in the drive unit 10 is arranged adjacent to a rear side of the engine 13. The engines 11 to 13 and the motor 14 have a direct-coupling structure to share an output shaft. In a vertical direction and the vehicle width direction of the vehicle 1, the motor 14 is formed to have a smaller external size than each of the engines 11 to 13.

Figure 5:
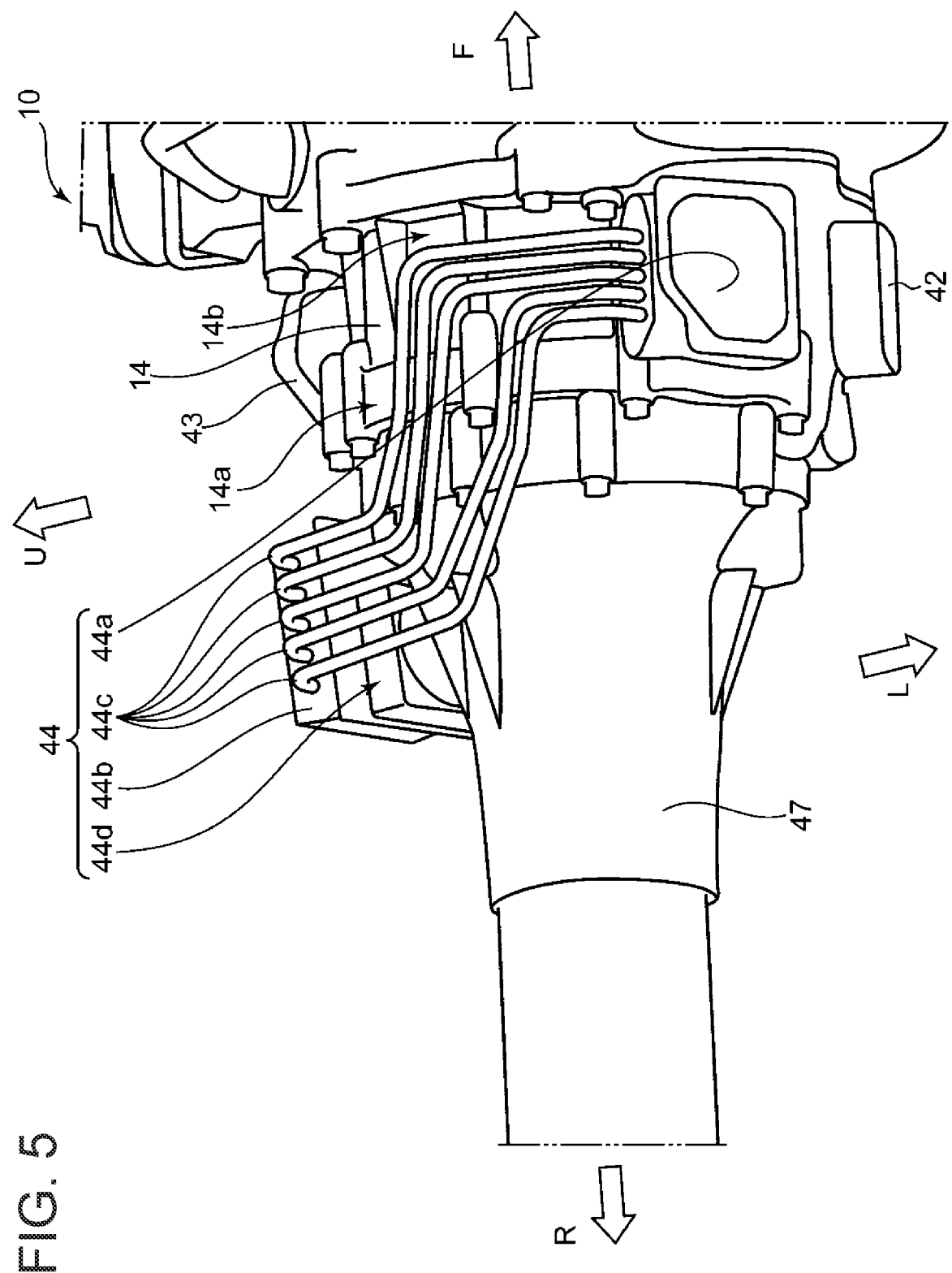
FIG. 5 is a perspective view illustrating arrangement of an ebullient cooler.

As illustrated in FIG. 3 to FIG. 5, two heat exchangers 42, 43 are attached to a side housing 14b of the motor 14. Both of the heat exchangers 42, 43 are arranged on the left side in the vehicle width direction. In addition, the heat exchanger 43 is attached to the side housing 14b of the motor 14 in a state of being separated upward from the heat exchanger 42. In addition, the heat exchangers 42, 43 are arranged to be located in front of a rear housing 14a of the motor 14. In other words, the heat exchanger 42 and the heat exchanger 43 are arranged to be located on the side housing 14b of the motor 14 in the longitudinal direction of the vehicle 1.

In addition, each of the heat exchanger 42 and the heat exchanger 43 has a flat external shape in which a dimension in a height direction is smaller than a dimension in a longitudinal dimension and a dimension in a width direction. The adoption of the heat exchanger 42 and the heat exchanger 43, each of which has such an external shape, is beneficial to downsize a set configuration in which the heat exchangers 42, 43 are attached to the drive unit 10.

As illustrated in FIG. 5, an end surface on a rear end side of the rear housing 14a of the motor 14 is covered with a torque tube 47. The torque tube 47 is an example of a "cover member" in the present disclosure. An ebullient cooler 44 is provided in an area from the side housing 14b of the motor 14 to a front portion of the torque tube 47. The ebullient cooler 44 has an ebullient section 44a, a condensation section 44b, pipes 44c, and an ebullient cooler fan 44d. Each of the pipes 44c in the ebullient cooler 44 is filled with an ebullient cooling refrigerant, a boiling point of which is lower than that of oil for cooling the motor 14.

The ebullient section 44a is a section that is attached to the side housing 14b of the motor 14 for heat exchange between the ebullient cooling refrigerant and the oil for cooling the motor 14 (motor cooling oil).

The condensation section 44b is attached to the front portion of the torque tube 47, which is arranged behind the motor 14. The condensation section 44b is a section that condenses the ebullient cooling refrigerant boiled (evaporated) by the heat exchange in the ebullient section 44a. Each of the pipes 44c is a circulation path for the ebullient cooling refrigerant between the ebullient section 44a and the condensation section 44b. The ebullient cooler fan 44d is a section that promotes the condensation of the ebullient cooling refrigerant by blowing air to the condensation section 44b.

In the ebullient cooler 44, the ebullient cooler fan 44d is arranged adjacent to a lower portion of the condensation section 44b. The ebullient cooler fan 44d blows the air upward. Since the condensation section 44b and the ebullient cooler fan 44d in the ebullient cooler 44 are attached to the torque tube 47 behind the motor 14, it is possible to prevent the air that has flowed through the condensation section 44b and has been warmed from being blown again to the housings 14a, 14b of the motor 14. Thus, this is effective to maintain the motor 14 at an appropriate temperature.

Although not illustrated in detail, paths, through each of which the motor cooling oil for cooling the motor 14 flows, and an oil control valve for switching the paths are provided in the housings 14a, 14b of the motor 14.

4. Cooling Configuration of Motor 14

A description will be made on a cooling configuration of the motor 14 in the drive unit 10 with reference to FIG. 6.

Figure 6:
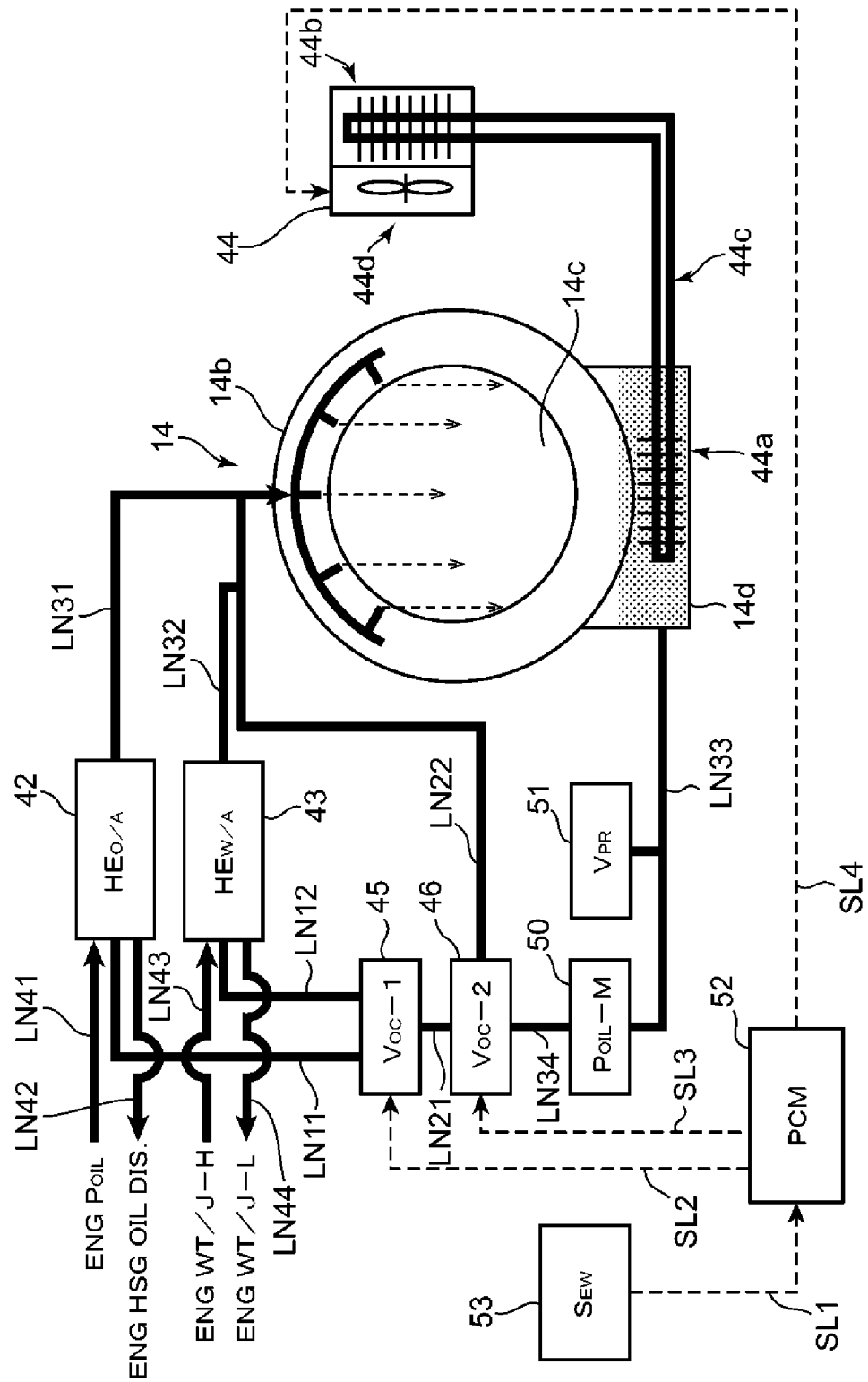
FIG. 6 is a schematic view illustrating a configuration related to cooling of a motor.

As illustrated in FIG. 6, the motor 14 has the housings 14a, 14b (only the side housing 14b is illustrated in FIG. 6), a rotor-stator 14c, and an oil pan 14d. Motor cooling oil paths LN22, LN31, LN32 are connected to upper portions of the housings 14a, 14b.

In the motor-drive mode, the motor cooling oil flows through any of the motor cooling oil paths LN22, LN31, LN32 to cool the rotor-stator 14c and then flows into the oil pan 14d. The motor cooling oil that has been received by the oil pan 14d is delivered to an oil pump 50 for the motor 14 through a motor cooling oil path LN33. A pressure-relief valve 51 is also connected to the motor cooling oil path LN33.

The motor cooling oil is delivered from the oil pump 50 to an oil control valve 46 through a motor cooling oil path LN34. The oil control valve 46 is a valve that switches the motor cooling oil delivery path to one of a motor cooling oil path LN21 and the motor cooling oil path LN22.

The motor cooling oil path LN21 is connected to an oil control valve 45. The oil control valve 45 is a valve that switches the motor cooling oil delivery path to one of a motor cooling oil path LN11 and a motor cooling oil path LN12.

The motor cooling oil path LN11 is connected to the motor cooling oil path LN31 via the heat exchanger 42. The motor cooling oil path LN12 is connected to the motor cooling oil path LN32 via the heat exchanger 43.

In an engine oil circulation path, the engine oil that is pumped out of the oil pump 33 flows from an engine cooling oil path LN41 to an engine cooling oil path LN42 via the heat exchanger 42. The engine oil that has flowed into the engine cooling oil path LN42 through the heat exchanger 42 is delivered to an eccentric shaft. Then, the engine oil lubricates and cools a rotor.

In addition, some of the engine oil that has flowed into the engine cooling oil path LN42 is injected into a combustion chamber of each of the engines 11 to 13 to lubricate and cool a housing, an apex seal, and a side seal.

In the heat exchanger 42, the motor cooling oil and the engine oil can exchange the heat. That is, in the motor-drive mode, the heat generated in the motor 14 can be transferred to the engine oil so as to cool the motor 14 and can thereby increase a temperature of the engine oil. Thus, in the vehicle 1, in the motor-drive mode, the engine oil circulation path can be shared to cool the motor 14, and each of the engines 11 to 13 in a state where fuel is not supplied to the combustion chamber can be warmed. As a result, it is possible to downsize the cooling system for the drive unit 10 and to improve engine efficiency at the time when the drive mode is shifted to the engine-drive mode.

In the coolant circulation path for the engines 11 to 13, the coolant that has flowed out of a high-pressure water jacket for the engines 11 to 13 flows from an engine coolant path LN43 to an engine coolant path LN44 via the heat exchanger 43. The coolant that has flowed into the engine coolant path LN44 through the heat exchanger 43 flows into a low-pressure water jacket for the engines 11 to 13.

In the heat exchanger 43, the motor cooling oil and the engine cooling coolant can exchange the heat. Also, in this way, in the motor-drive mode, the heat generated in the motor 14 can be transferred to the coolant so as to cool the motor 14 and can thereby increase a temperature of the coolant. Thus, it is possible to downsize the cooling system for the drive unit 10 and to improve the engine efficiency at the time when the drive mode is shifted to the engine-drive mode. In the case where the cooling system for transferring the heat of the motor cooling oil to the coolant is used for the heat exchanger 43, higher cooling performance can be achieved than a case where a cooling system for transferring the heat of the motor cooling oil to the engine oil is used for the heat exchanger 42. This is because the radiator 31 for cooling the coolant is larger than the oil cooler 32 and also because the radiator 31 has the radiator fan 31a.

The ebullient section 44a of the ebullient cooler 44 is disposed in the oil pan 14d of the motor 14. Here, as it has been described with reference to FIG. 5, an outer housing of the ebullient section 44a is attached to the side housing 14b of the motor 14, and the ebullient cooling refrigerant, with which the pipes 44c are filled, can exchange the heat with the motor cooling oil in the oil pan 14d.

The vehicle 1 also includes a valve control unit 52 and an engine coolant temperature sensor 53. The engine coolant temperature sensor 53 is, for example, provided to a pipe 36 between the engine 13 and the radiator 31. The valve control unit 52 is configured to include a microcomputer that has a processor (i.e., a central processing unit (CPU)), memory (i.e., ROM and/or RAM), and the like. The valve control unit 52 is connected to the engine coolant temperature sensor 53 by a signal line SL1, is connected to the oil control valves 45, 46 by signal lines SL2, SL3, respectively, and is connected to the ebullient cooler fan 44d of the ebullient cooler 44 by a signal line SL4.

5. Cooling Control Method for Motor 14 Executed by Valve Control Unit 52

In the motor-drive mode (in the case where the vehicle 1 travels by the drive power of the motor 14), the valve control unit 52 executes switching control of the oil control valves 45, 46 and drive control of the ebullient cooler fan 44d on the basis of information on an engine coolant temperature from the engine coolant temperature sensor 53. More specifically, the valve control unit 52 executes the control as follows.

(1) In the Case where Engine Coolant Temperature is Lower than a First Threshold (for Example, 40° C.)

In the case where the engine coolant temperature is lower than a first threshold, the valve control unit 52 executes the switching control of the oil control valve 46 so as to connect the motor cooling oil path LN34 and the motor cooling oil path LN21, and executes the switching control of the oil control valve 45 so as to connect the motor cooling oil path LN21 and the motor cooling oil path LN11. The ebullient cooler fan 44d is in a stopped state.

(2) In the Case where Engine Coolant Temperature is Equal to or Higher than the First Threshold and is Lower than a Second Threshold (for Example, 80° C.)

In the case where the engine coolant temperature is equal to or higher than the first threshold and is lower than a second threshold, the valve control unit 52 executes the switching control of the oil control valve 46 so as to connect the motor cooling oil path LN34 and the motor cooling oil path LN21, and executes the switching control of the oil control valve 45 so as to connect the motor cooling oil path LN21 and the motor cooling oil path LN12. Then, the valve control unit 52 drives the ebullient cooler fan 44d.

(3) In the Case where Engine Coolant Temperature is Equal to or Higher than the Second Threshold In the case where the engine coolant temperature is equal to or higher than the second threshold, the valve control unit 52 executes the switching control of the oil control valve 46 so as to connect the motor cooling oil path LN34 and the motor cooling oil path LN21. Then, the valve control unit 52 maintains a driven state of the ebullient cooler fan 44d.

6. Arrangement of Inverter 27

A description will be made on an arrangement mode of the inverter 27 in the vehicle 1 with reference to FIG. 7 to FIG. 9.

Figure 7:
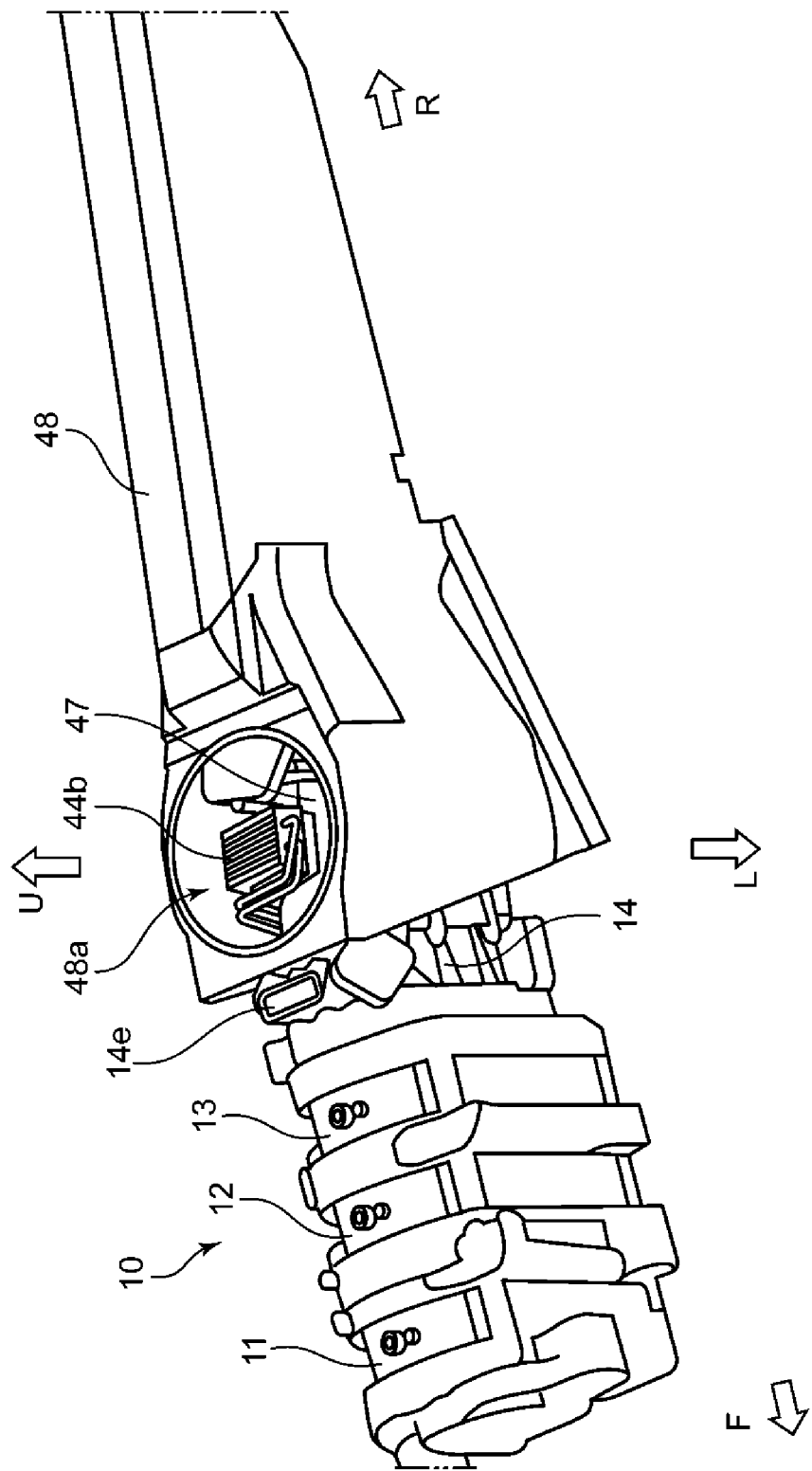
FIG. 7 is a perspective view illustrating a configuration behind the drive unit.

As illustrated in FIG. 7, the torque tube 47, which is provided behind the motor 14 in the drive unit 10, is accommodated in an internal space (a lower space) 48a of a floor tunnel 48 in a floor panel (the vehicle body). The floor tunnel 48 is a portion that is provided behind a dash panel (not illustrated) for dividing the front area 1a and a cabin, and is provided as a portion that reinforces the floor panel.

Each of the components including the condensation section 44b of the ebullient cooler 44 is also accommodated in the internal space 48a of the floor tunnel 48.

Figure 8:
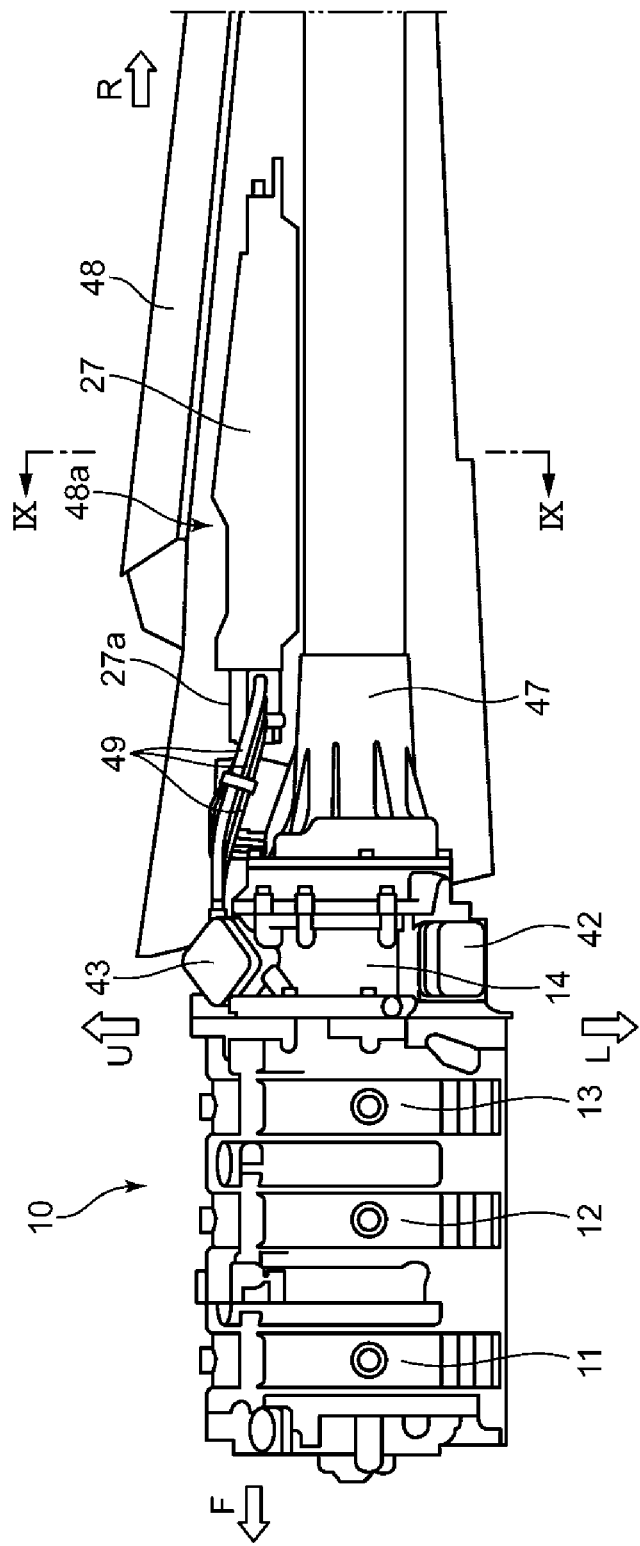
FIG. 8 is a side view illustrating an arrangement mode of inverter.

As illustrated in FIG. 8, in the internal space 48a of the floor tunnel 48, the inverter 27 is arranged above the torque tube 47. At the position above the torque tube 47, the inverter 27 is arranged along a longitudinal direction of the torque tube 47. The inverter 27 has a terminal 27a in a front portion thereof.

Three wire harnesses 49 are connected to the terminal 27a. Each of the three wire harnesses 49 is a flexible connection wire and electrically connects the inverter 27 and the motor 14. The terminal 27a is an example of an "output terminal" in the present disclosure.

Figure 9:
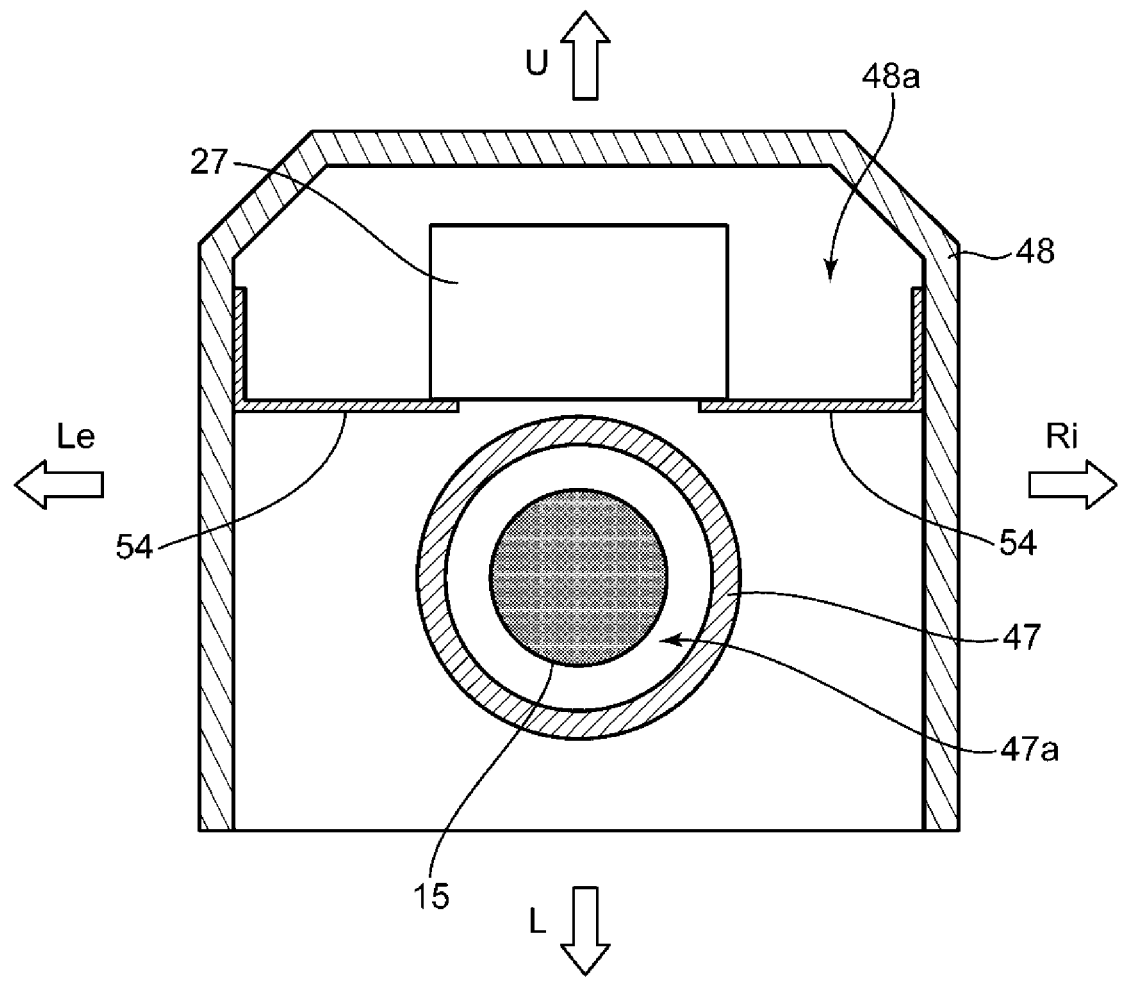
FIG. 9 is a cross-sectional view illustrating the arrangement mode of the inverter.

As illustrated in FIG. 9, in the internal space 48a of the floor tunnel 48, the inverter 27 is attached to the floor tunnel 48 via a bracket 54. A clearance is provided between the inverter 27 and the torque tube 47. The propeller shaft 15 is accommodated in an internal space 47a of the torque tube 47.

Here, even in the case where the torque tube 47 vibrates with the drive unit 10 during driving of the drive unit 10, the vibration is not directly transmitted to the inverter 27 due to the clearance between the inverter 27 and the torque tube 47.

In addition, as described above, while the drive unit 10 is attached to the front subframe, the inverter 27 is attached to the floor tunnel 48 that is separated from the first position. Accordingly, even when the vibration is generated during driving of the drive unit 10, the transmission of the vibration from the drive unit 10 to the inverter 27 via an attachment position in the vehicle body is suppressed.

The front subframe is an example of a "first position of the vehicle body" in the present disclosure, and the portion formed with the floor tunnel in the floor panel is an example of a "second position of the vehicle body" in the present disclosure.

7. Arrangement Structure of Wire Harnesses 49

A description will be made on an arrangement structure of the wire harnesses 49 with reference to FIG. 10 and FIG. 11.

Figure 10:
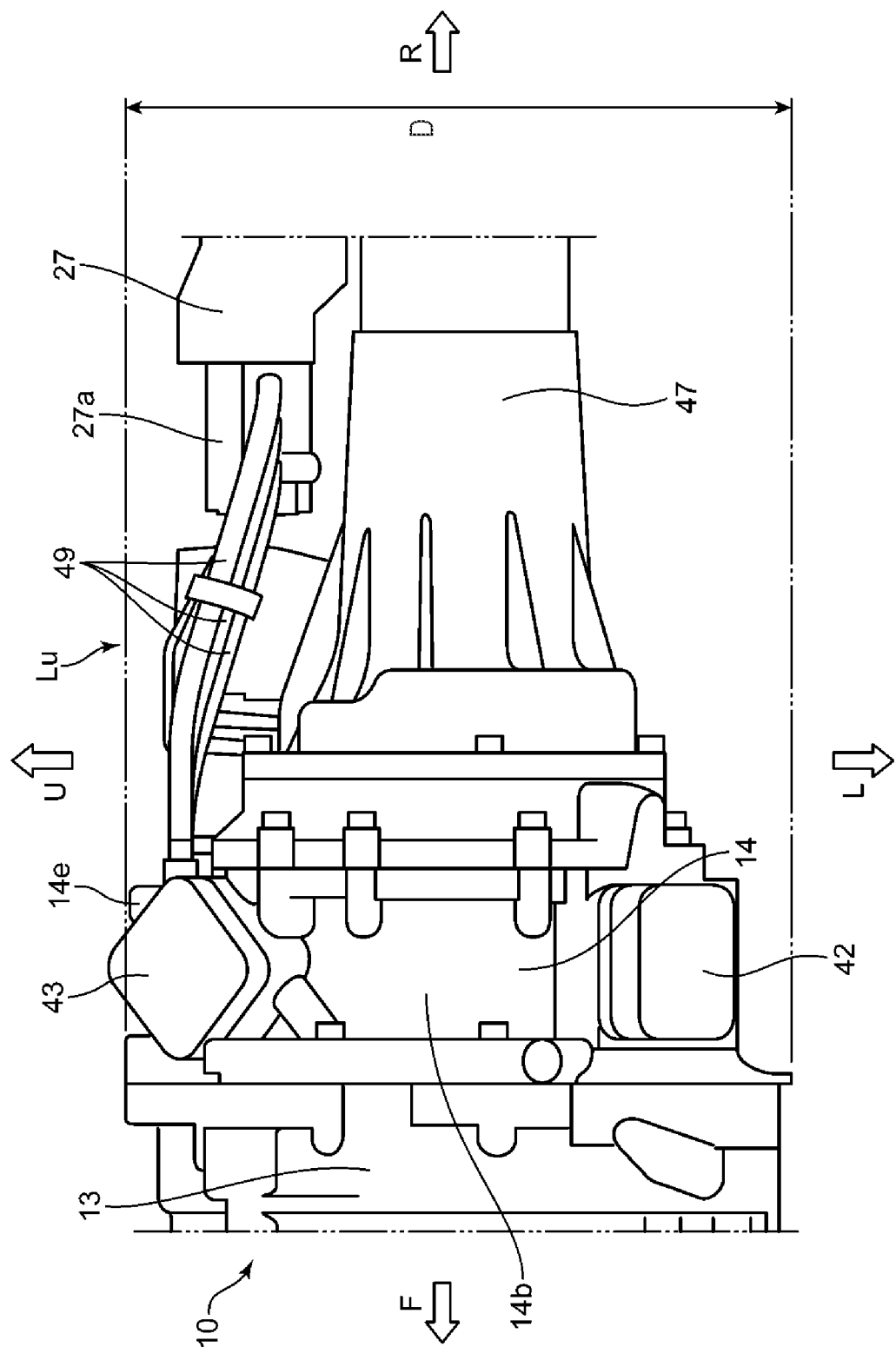
FIG. 10 is a side view illustrating an arrangement structure of a wire harness.
Figure 11:
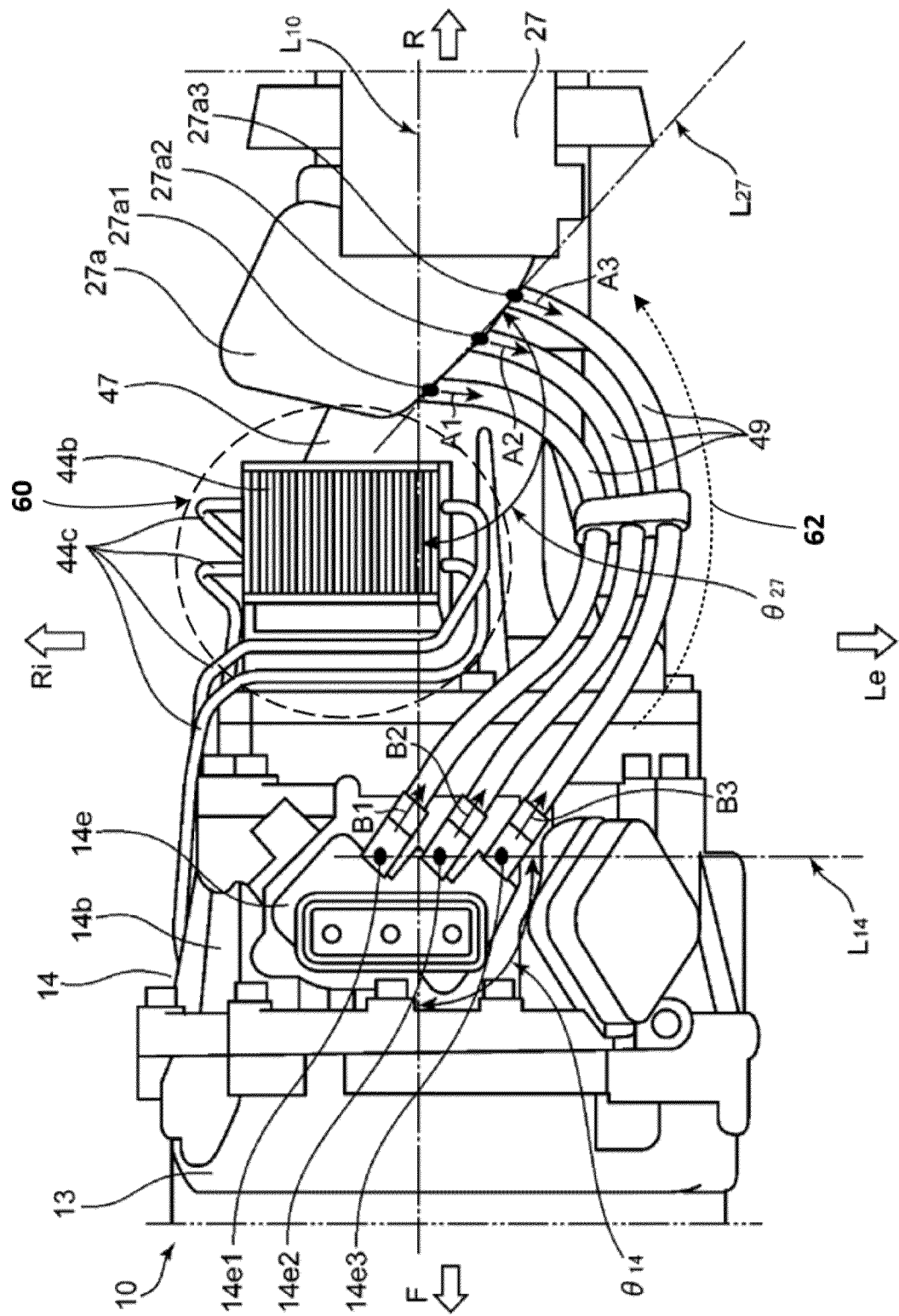
FIG. 11 is a plan view illustrating the arrangement structure of the wire harness.

As illustrated in FIG. 10 and FIG. 11, the terminal 27a of the inverter 27 and a terminal (an input terminal) 14e of the motor 14 are connected by the three wire harnesses 49. The terminal 14e of the motor 14 is disposed on the side housing 14b of the motor 14. As illustrated in FIG. 11, the terminal 27a as the output terminal of the inverter 27 and the terminal 14e as the input terminal of the motor 14 are arranged to have such a positional relationship that the terminal 27a and the terminal 14e oppose each other in the longitudinal direction of the vehicle 1.

As illustrated in FIG. 11, an end of each of the three wire harnesses 49 is connected to respective one of connection portions 27a1 to 27a3 provided to the terminal 27a of the inverter 27. In the case where an imaginary straight line $L_{27}$ that runs through the connection portions 27a1 to 27a3 is assumed, the connection portions 27a1 to 27a3 are disposed such that the imaginary straight line $L_{27}$ is oriented in an oblique direction at an angle $\theta_{27}$ with respect to a center axis $L_{10}$ of the drive unit 10. The angle $\theta_{27}$ is an obtuse angle that is larger than 90°. Each of the connection portions 27a1 to 27a3 are an example of a "first connection portion" in the present disclosure, and the imaginary straight line $L_{27}$ is an example of a "first imaginary straight line" in the present disclosure.

Each of the three wire harnesses 49 extends obliquely to the left in the vehicle 1 from the terminal 27a (arrows A1 to A3).

The other end of each of the three wire harnesses 49 is connected to respective one of connection portions 14e1 to 14e3 that are provided to the terminal 14e of the motor 14. In the case where an imaginary straight line $L_{14}$ that runs through the connection portions 14e1 to 14e3 is assumed, the connection portions 14e1 to 14e3 are disposed such that the imaginary straight line $L_{14}$ is oriented at an angle $\theta_{14}$ with respect to the center axis $L_{10}$ of the drive unit 10. The angle $\theta_{14}$ is approximately 90°. Each of the connection portions 14e1 to 14e3 are an example of a "second connection portion" in the present disclosure, and the imaginary straight line $L_{14}$ is an example of a "second imaginary straight line" in the present disclosure.

Each of the three wire harnesses 49 extends obliquely to the left in the vehicle 1 from the terminal 14e (arrows B1 to B3).

As illustrated in FIG. 11, each of the three wire harnesses 49 has a wire length that is longer than a linear distance between respective one of the connection portions 27a1 to 27a3 of the terminal 27a and respective one of the connection portions 14e1 to 14e3 of the terminal 14e. Accordingly, the three wire harnesses 49 are arranged in a curved state 62 so as to run around an area 60 between the terminal 27a and the terminal 14e. In the area 60 that is run around by the wire harnesses 49, the condensation section 44b of the ebullient cooler 44 is disposed. In addition, since the wire harnesses 49 are arranged to be curved to the left, it is possible to dispose the pipes 44c of the ebullient cooler 44 on the right side. In this way, it is possible to attach the inverter 27 and the ebullient cooler 44 to the drive unit 10 with high space efficiency and to downsize the drive unit 10, the inverter 27, and the ebullient cooler 44 as a whole.

As illustrated in FIG. 10, the three wire harnesses 49 are arranged to run above the torque tube 47 so as not to contact the torque tube 47. In addition, the three wire harnesses 49 are arranged within an outer circumference D of the engines 11 to 13 in the drive unit 10. In particular, the three wire harnesses 49 are arranged to run above upper ends of the engines 11 to 13 and below an imaginary straight line Lu drawn in the longitudinal direction of the vehicle 1. In this way, the wire harnesses 49 can fit within the internal space 48a of the floor tunnel 48 without increasing size of the floor tunnel 48 in a cross-sectional direction.

As illustrated in FIG. 11, the three wire harnesses 49 are arranged with clearances interposed therebetween and not to cross each other. In this way, the three wire harnesses 49 are prevented from contacting each other, which suppresses damage to coated portions, and the like.

Modified Examples

In the above embodiment, as illustrated in FIG. 11, the wire harnesses 49 are arranged to be curved to the left. However, in the present invention, the wire harnesses 49 may be arranged to be curved to the right.

In the above embodiment, the inverter 27 is attached to the floor tunnel 48. However, the present invention is not limited thereto. When the inverter is attached to a different position from the position, to which the drive unit in the vehicle body is attached, the same effects as above can be exerted.

In the above embodiment, an AC motor is adopted as the motor 14, and thus the inverter 27 is provided between the battery 26 and the motor 14. However, in the present invention, any of various power converters can be provided according to the type of the motor. For example, in the case where a DC/DC converter (a DC chopper) or the like is adopted, by adopting the same connection wires as those in the above embodiment, the same effects as above can be exerted.

In the above embodiment, the drive unit 10, which is configured to include the three engines 11 to 13 and the single motor 14, is adopted. However, the present invention is not limited thereto. For example, a drive unit configured to include a single engine and a single motor or a drive unit configured to include a plurality of engines and a plurality of motors can be adopted.

In the above embodiment, each of the engines 11 to 13 is the rotary engine. However, a reciprocating engine can be adopted in the present invention. However, in the above embodiment in which the rotary engine is adopted, the drive unit 10 can be downsized, and the drive unit 10 can be arranged in the area near the center of the vehicle 1. Thus, the adoption of the rotary engines as the engines 11 to 13 in the vehicle 1 is beneficial for achieving higher vehicle motion performance. However, the rotary engine is of a high-speed type and thus generates significant vibration at the time of driving. Meanwhile, when the inverter and the connection wires are configured as in the above embodiment, it is possible to suppress damage to the inverter and the connection wires.

In the above embodiment, an FR (front engine, rear-wheel drive) vehicle is adopted as an example of the vehicle 1. However, the present invention is not limited thereto. For example, an RR (rear engine, rear-wheel drive) vehicle, in which the drive unit is mounted in a rear portion and transmits the drive power to rear wheels, an MR (mid-engine, rear-wheel drive) vehicle, in which the drive unit is mounted to a position behind a driver's seat to transmit the drive power to rear wheels, or further an FF (front engine, front-wheel drive) vehicle, in which the drive unit is mounted to a rear portion of a front area to transmit the drive power to front wheels, can be adopted.

In the above embodiment, as described with reference to FIG. 11, the connection portions 27a1 to 27a3 are arranged such that the imaginary straight line $L_{27}$ crosses the center axis $L_{10}$ at the angle $\theta_{27}$, which is larger than 90°, and the connection portions 14e1 to 14e3 are arranged such that the imaginary straight line $L_{14}$ crosses the center axis $L_{10}$ at the angle $\theta_{14}$, which is approximately 90°. However, the present invention is not limited thereto. For example, the connection portions 27a1 to 27a3 may be arranged such that the angle $\theta_{27}$ becomes approximately 90°, and the connection portions 14e1 to 14e3 may be arranged such that the angle $\theta_{14}$ becomes smaller than 90°. Alternatively, the connection portions 27a1 to 27a3 may be arranged such that the angle $\theta_{27}$ becomes larger than 90° and the connection portions 14e1 to 14e3 may be arranged such that the angle $\theta_{14}$ becomes smaller than 90°. In the case where the angle $\theta_{27}$ is set to be larger than 90° and the angle $\theta_{14}$ is set to be smaller than 90°, in a plan view from the above, the imaginary straight line $L_{27}$ and the imaginary straight line $L_{14}$ slant downward.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS 1 vehicle
10 drive unit
11 to 13 engine
14 motor
14a rear housing (housing)
14e terminal (input terminal)
14e1 to 14e3 connection portion (second connection portion)
15 propeller shaft (shaft)
26 battery
27 inverter
27a terminal (output terminal)
27a1 to 27a3 connection portion (first connection portion)
44 ebullient cooler
44b condensation section (motor cooling member)
44c pipe (motor cooling member)
47 torque tube (cover member)
48 floor tunnel
49 wire harness (connection wire)

The invention claimed is:

1. A vehicle comprising:
a drive unit that is a drive source for travel of the vehicle and includes an engine and a motor arranged adjacent to each other;
an inverter that converts a DC current into an AC current and outputs the AC current;
a connection wire that electrically connects an output terminal of the inverter and an input terminal of the motor;
a shaft that is coupled to an output shaft of the drive unit and transmits drive power to a drive wheel; and
a cover member that covers a periphery of the shaft, wherein
the inverter is arranged separately from the drive unit and spaced away from the cover member,
the connection wire is flexible and is formed of a wire harness, a wire length of which is longer than a linear distance between the output terminal of the inverter and the input terminal of the motor, and when the cover member and the connection wire are seen from an outer side in a direction that crosses an extending direction of the shaft, the connection wire is arranged to be curved in a manner to bypass a specified area above the cover member and between the input terminal and the output terminal, a motor cooling member being arranged in the specified area.

2. The vehicle according to claim 1, wherein the drive unit is attached to a first position of the vehicle that is provided in a lower portion of a front area of the vehicle, and the inverter is attached to a second position that is separated from the first position.

3. The vehicle according to claim 2, wherein the second position is located at a portion formed with a floor tunnel in a floor panel, and the connection wire is arranged in the floor tunnel.

4. The vehicle according to claim 3, wherein when the engine and the connection wire are seen from one side in a direction in which the engine and the motor are adjacent to each other, the connection wire is arranged to be located on an inner side of an outer circumference of the engine.

5. The vehicle according to claim 1 further comprising:

a motor cooling oil path as a path of oil for cooling the motor; and an ebullient cooler having:
- a circulation path for circulating an ebullient cooling refrigerant, a boiling point of which is lower than that of the oil flowing through the motor cooling oil path;
- an ebullient section that is disposed in the middle of the circulation path and in which the oil and the ebullient cooling refrigerant exchange heat; and
- a condensation section that condenses the ebullient cooling refrigerant, wherein the motor cooling member is the condensation section of the ebullient cooler.

6. The vehicle according to claim 5, wherein the condensation section is attached to an upper side of the cover member in a vertical direction of the vehicle.

7. The vehicle according to claim 6, wherein the connection wire is one of a plurality of connection wires, one end of each of the connection wires is connected to respective one of a plurality of first connection portions in the output terminal, and the other end of each of the connection wires is connected to respective one of a plurality of second connection portions in the input terminal, and at least one of a first imaginary straight line running through the plurality of the first connection portions and a second imaginary straight line running through the plurality of the second connection portions extends in an oblique direction with respect to a center axis of the drive unit at an angle θ, the center axis of the drive unit extending in a longitudinal direction of the vehicle and the angle θ being larger than 90° and less than 180°.

8. The vehicle according to claim 1, wherein the engine is a rotary engine.

9. The vehicle according to claim 1, wherein when the engine and the connection wire are seen from one side in a direction in which the engine and the motor are adjacent to each other, the connection wire is arranged to be located on an inner side of an outer circumference of the engine.

10. The vehicle according to claim 1, wherein a plurality of the connection wires are provided, one end of each of the connection wires is connected to respective one of a plurality of first connection portions in the output terminal, and the other end of each of the connection wires is connected to respective one of a plurality of second connection portions in the input terminal, and at least one of a first imaginary straight line running through the plurality of the first connection portions and a second imaginary straight line running through the plurality of the second connection portions extends in an oblique direction with respect to a center axis of the drive unit at an angle θ, the center axis of the drive unit extending in a longitudinal direction of the vehicle and the angle θ being larger than 90° and less than 180°.

11. The vehicle according to claim 1, wherein the motor provided in the drive unit is arranged adjacent to a rear side of the engine, and the engine and the motor have a direct-coupling structure to share the output shaft.

12. The vehicle according to claim 11, wherein the engine is a rotary engine.

* * * * *